July 3, 1928.  
C. L. BEAL  
1,675,783
PHOTOGRAPH ENLARGING LIGHT BOX
Filed April 22, 1925
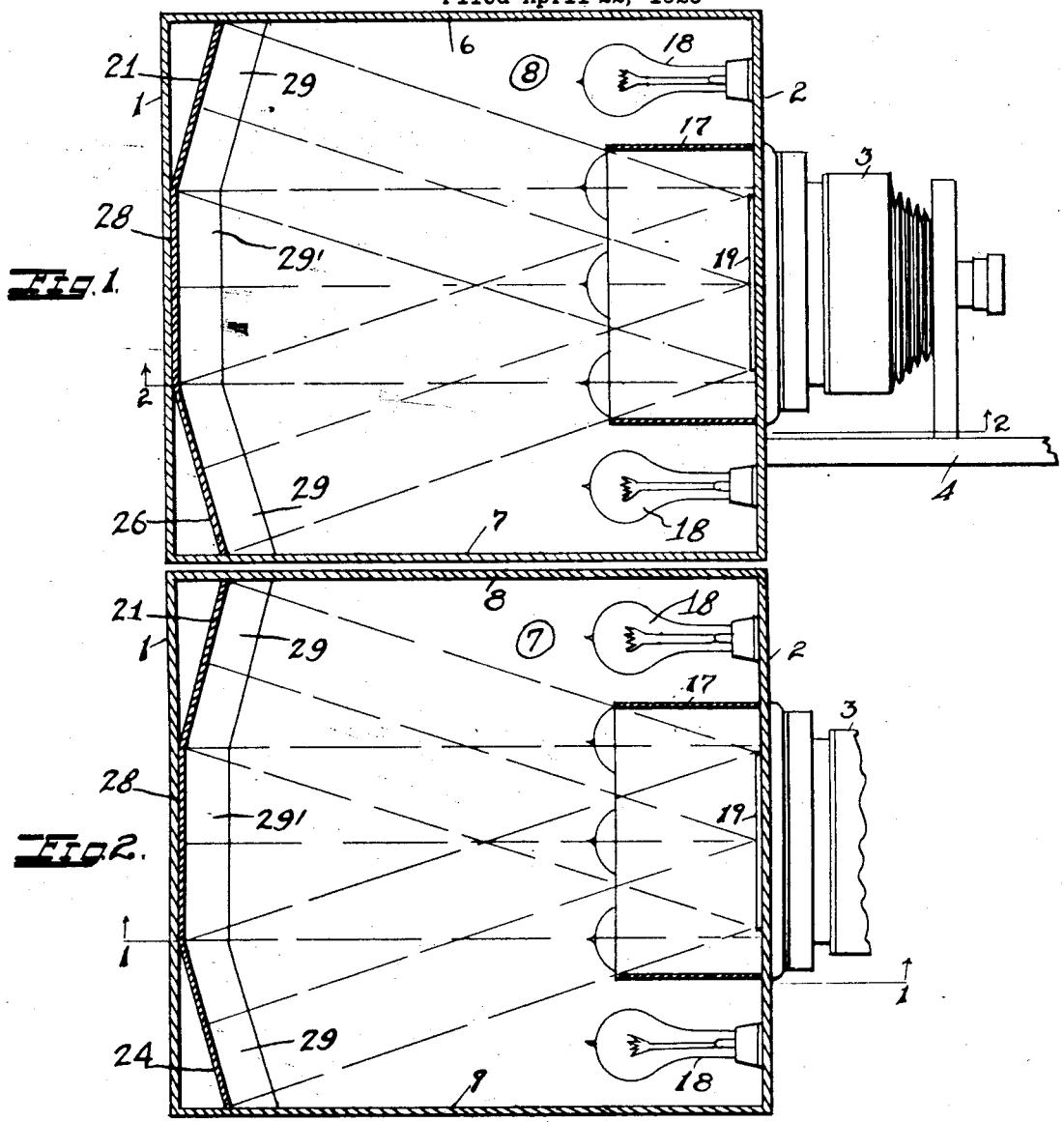
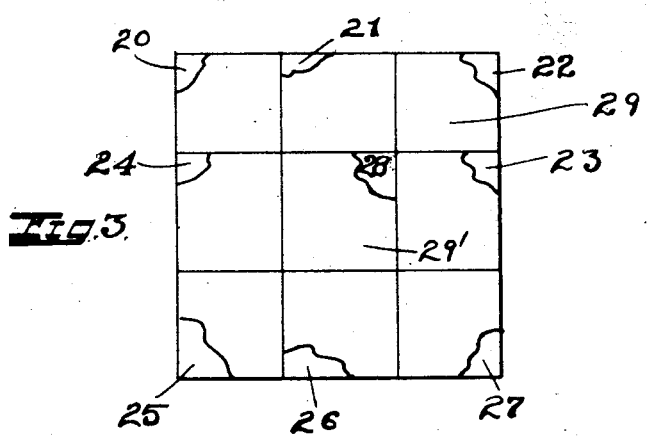
INVENTOR.  
Charles L. Beal.  
BY Carlos P. Griffin  
ATTORNEY Patented July 3, 1928.

1,675,783

UNITED STATES PATENT OFFICE.

CHARLES L. BEAL, OF SAN FRANCISCO, CALIFORNIA.

PHOTOGRAPH-ENLARGING LIGHT BOX.

Application filed April 22, 1925. Serial No. 24,981.

This invention relates to a photographic reproducing apparatus for making reduced, enlarged or equal sized photographs, by projection, from negatives, also the illumination of negatives by transmitted light for the purpose of making lantern slides or transparencies by photographic process, and its object is to produce a more evenly distributed and diffused light over the entire area of the negative without condensers, flashed opal or ground glass, or any other artificial means of diffusion being placed between the negative and the source of light than has heretofore been obtained by the use of such artificial means of diffusion, and at the same time to retain approximately all the definition and detail obtained in contact printing.

It will be understood by those skilled in the art (of photographic reproduction) that it is very difficult, if not impossible, with all ordinary apparatus, to produce enlargements, etc., without more or less loss of definition and detail and without more or less uneven printing, circles of diffusion, and spots appearing in the prints.

In order to lessen these troubles various kinds of reflecting mirrors, condensing lenses, flashed opal and ground glass plates, paper and cloth screens, etc., have been used to break up and scatter the light rays over the area of the negative to be printed, projected or photographed. Optically ground and corrected mirrors, lenses and plates for diffusion purposes would be prohibitive in price and the commercial articles now on the market fail to produce the even diffusion desired.

The present invention contemplates only the use of reflected light, and is so arranged that no light whatever from the lamps used can directly strike the negative. A plurality of plane surfaces are used to control and direct the light to the negative which will reflect the light to all parts of the plate, thereby eliminating the uneven distribution of the light over the area of the negative and avoiding the necessity of mirrors, lenses, glass plates or other screens.

In the present instance a series of nine flat reflecting surfaces are used and they are so arranged as to control practically all of the light and to direct it to the area in which the negative is placed, the surfaces being placed at right angles to the line of direction of the reflected beam of light to the negative to be printed from, and the reflecting surfaces may be made of white cloth, a fine white net, a white chalk surface, a white blotting paper, a ground glass with rough side toward the negative and light source, or any dull white surface.

Other objects of the invention will appear as the description proceeds.

An embodiment of the invention is shown in the accompanying drawings in which the same reference numeral is applied to the same portion throughout, but we are aware that there may be modifications thereof.

Fig. 1 is a sectional elevation of the light box showing the camera on the front thereof on line 1—1, Fig. 2.

Fig. 2 is a plan view in section of the light box, on line 2—2, Fig. 1.

Fig. 3 is a front elevation of the reflecting surfaces showing the arrangement of the several planes used.

The numeral 1 indicates the back of the light box, and 2 the front to which the focusing camera 3 is attached, the bed 4 on which the camera is slidable being supported by the front as well.

The light box front and back has the panels 6 to 9, connecting them at top, bottom and sides.

Inside the front 2 there is a box-like shield 17 to prevent any direct rays from the lamps 18, which are mounted on the inside of the front, from striking the plate in the holder 19.

At the back of the light box there are eight plane supports, 20 to 27 inclusive, arranged so a line from any point on the plate to a corresponding point on them will strike them at a right angle to their faces. These supports may then be covered with any one of the surfaces mentioned, as indicated at 29, and the center of the back 28 has the reflecting member 29' secured thereto. Since there is very little reflection from the surfaces used at an angle reverse to the angle of incidence, the only light striking the plate is that of a glow with substantially uniform illumination over the entire body of the plate.

All the parts of the box, except the surfaces 20 to 28, inclusive, are painted or enamelled a glossy white, but the light striking such surfaces is in turn directed to the surfaces 20 to 28, inclusive, since the shield 17 prevents it from striking the plate directly.

It will be seen that the light is so perfectly diffused, that no ground glass, or other screen, at the negative is necessary, and much better results are attained than is possible with any such screen, pictures made with this box having full detail to their edges.

What I claim is as follows, but modifications may be made in carrying out the invention shown in the drawings and in the above particularly described form thereof, within the purview of the invention.

1. In a light box for reproducing cameras, the combination of an enclosure, a plate support therefor, a series of lights in the front end of the enclosure, a shield on said front end to prevent direct rays from the lights from striking the plate, and several light reflecting surfaces arranged normal to lines therefrom to corresponding points on the plate covered with a material capable of reflecting a strong and evenly distributed light to said plate.

2. In a light box for reproducing cameras, the combination of an enclosure, a plate support on one end therefor, a series of lights in the enclosure surrounding said plate, a shield to prevent direct rays from the lights from striking the plate, and several light reflecting surfaces being arranged at predetermined angles whereby their normally reflected beams will be superposed on the plate to be reproduced.

3. In a light box for reproducing cameras, the combination of an enclosure, a plate support on one end therefor, a series of lights in the enclosure surrounding said plate, a shield to prevent direct rays from the lights from striking the plate, and several plane light reflecting surfaces arranged normal to lines therefrom to corresponding points on the plate covered with a material capable of reflecting an equally diffused light to all parts of said plate.

4. In a light box for reproducing cameras, the combination of an enclosure, a plate support therefor, a series of lights in the enclosure surrounding said plate, a shield to prevent direct rays from the lights from striking the plate, and several plane light reflecting surfaces being arranged at predetermined angles whereby their normally reflected beams will be superposed on the plate to be reproduced.

5. A photograph enlarging light box comprising a back, front, sides, top and bottom members, a box like shield fixed on the front member, a plate in the back of said shield, lamps mounted on said front member surrounding said shield, a plurality of flat reflecting surfaces mounted so that the light in said lamp will be reflected on the plate in said shield, and a camera on the outside of said box.

In testimony whereof I have hereunto set my hand this 16 day of April, A. D. 1925.

CHARLES L. BEAL.